June 24, 1924.

J. E. CADY

METHOD OF MANUFACTURING INNER TUBES

Filed Sept. 5, 1923

1,498,864

Inventor
JOHN E. CADY
By his Attorney

Patented June 24, 1924.

1,498,864

UNITED STATES PATENT OFFICE.

JOHN E. CADY, OF INDIANAPOLIS, INDIANA, ASSIGNOR TO G & J TIRE COMPANY, OF INDIANAPOLIS, INDIANA, A CORPORATION OF INDIANA.

METHOD OF MANUFACTURING INNER TUBES.

Application filed September 5, 1923. Serial No. 661,036.

*To all whom it may concern:*

Be it known that I, JOHN E. CADY, a citizen of the United States, residing at Indianapolis, county of Marion, and State of Indiana, have invented a certain new and useful Method of Manufacturing Inner Tubes, of which the following is a full, clear, and exact description.

This invention relates to the marking of rubber articles during their manufacture so that they may be treated after vulcanization at a definite point, and more particularly, to a method of manufacturing inner tubes so that their valve-stem openings may be punched in the center of the valve-base.

In the manufacture of inner tubes, the opening or hole for the valve-stem has been made in a variety of ways and various procedures have been followed in an endeavor to insure location of the hole in the center of the valve-base. This invention aims to provide a simple, reliable and inexpensive method of indicating the point to punch the hole for the valve-stem so as to insure its passing through the center of the valve-base.

With the preferred embodiment of the invention in mind and without intention to limit its scope more than is required by the prior art, it may be stated, briefly, to consist in locating a disk of rubber composition containing a softening agent and a coloring matter in the center of the valve-base so that after vulcanization, the point to punch the hole is indicated by a dot of contrasting color which has migrated or diffused to a surface of the tube.

An embodiment of the invention is illustrated in the accompanying drawings, in which:—

Figure 1:
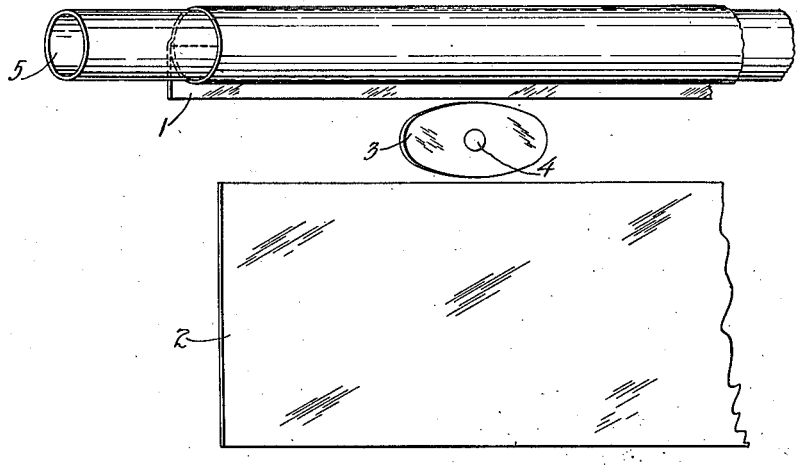
Figure 1 illustrates diagrammatically one method of plying up vulcanizable rubber composition on a pole.
Figure 2:
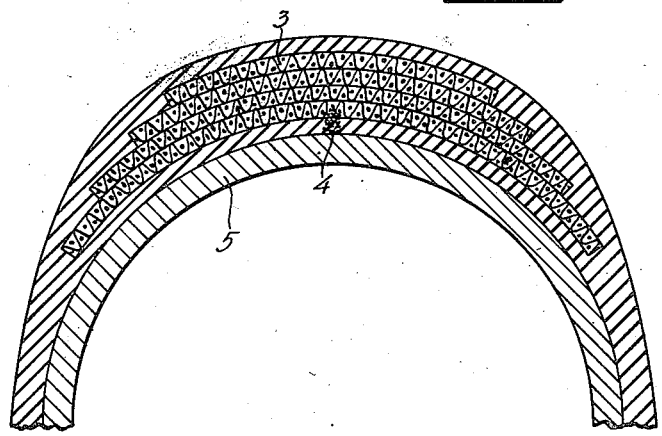
Figure 2 is a fragmentary section of a tube as it appears on a pole after vulcanization, the migratory color being indicated by stippling.
Figure 3:
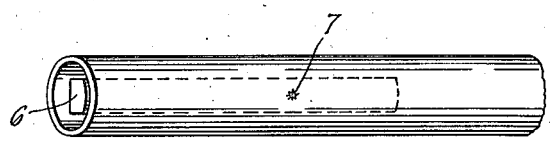

And Figure 3 is a diagrammatic perspective showing how the inner tube may be punched.

The invention is preferably carried on in the manner which will first be described.

Vulcanizable rubber composition is formed into sheets 1 and 2, and a valve-base, indicated diagrammatically at 3, is built up of a plurality of layers of rubberized fabric, woven or unwoven, in any suitable and well-known manner. On the valve-base 3 is located a piece 4 of rubber composition, preferably in the form of a small disk. The pieces 4 are preferably died out of a sheet of stock containing 100 parts of rubber composition, 5 parts of a softener and 5 parts of coloring matter. While these components may be varied widely, it is preferred to employ the same rubber composition in the pieces 4 as is used for making the body of the tube, that is, the sheets 1 and 2. The preferred softener is glycerin and the preferred coloring matter for gray tubes is methylene blue. Of course, any suitable coloring may be used instead of methylene blue, it being essential only to obtain a color different from the body of the tube when vulcanized. Instead of glycerin as a softener, aniline, carbon disulphide, castor oil, hydro-carbon, and low volatile oils in general may be employed.

In the preferred process, the sheet 1 of vulcanizable rubber composition is first rolled about a pole or mandrel 5, then the valve-base 3, carrying the disk 4, is applied, and then the second sheet of vulcanizable rubber composition 2 is rolled about the pole so that the valve-base is located between plies of the stock and, consequently, interiorly of the finished tube. This interior location of the valve-base is preferred as it is believed to be a better construction, but it is to be understood that the valve-base may be located on either face of the stock, if desired, and that the present invention in its broadest aspects comprehends location of the valve-base on the outside inasmuch as the rubber composition during cure films over the valve-base in any location and is not visible.

After the tube has been thus completely assembled or built on the mandrel, it is then vulcanized in any suitable and convenient manner, with or without being externally confined. After being vulcanized, the completely cured tube is stripped from the pole, in which operation it is ordinarily turned inside out. This brings the migrated coloring substance of contrasting color on the outside of the tube and the coloring substance, which has migrated or diffused to the surface in contact with the pole, is thus brought to the outside and made visible.

The operator then slips a block of wood 6, or other suitable anvil piece, in the tube beneath the spot of contrasting color 7 and punches a hole which will, of course, pass through substantially the center of the valve-base as desired. Thereafter, the ends of the tube are spliced and the valve mounted in a well-known manner.

In the foregoing, the invention has been disclosed as practiced in what is known as a "plied" method of manufacturing inner tubes. Obviously, however, it may be utilized in various methods of assembling rubber composition and valve-bases that are known to the trade and, therefore, the invention is not confined to the precise method disclosed above in detail. Reference should therefore be made to the accompanying claims for an understanding of the scope of the invention.

Having thus described my invention, what I claim and desire to protect by Letters Patent is:—

1. That method of indicating the point to punch inner tubes in the center of their valve-bases, which consists in, assembling vulcanizable rubber composition and a valve-base, locating a migratory substance of a color contrasting with the rubber when vulcanized in a line passing through the center of the valve-base, vulcanizing the tube and causing migration of the contrasting colored substance, and forming an aperture in the inner tube at the point indicated by the contrasting color.

2. That method of marking rubber goods during manufacture for treatment after vulcanization at a definite location relative to an internal element of the goods which consists in, incorporating migratory matter of a color contrasting with the vulcanized rubber in the article during its assemblage, vulcanizing the article and causing migration of the contracting colored substance, and finally treating the article at the point indicated by the migrated coloring matter.

3. That method of manufacturing inner tubes which consists in, building a valve-base, forming vulcanizable rubber composition tubular and incorporating the valve-base internally thereof, locating a migratory substance of contrasting color in line with the center of the valve-base, vulcanizing the inner tube and causing migration of the contrasting colored substance, and forming an aperture in the inner tube through the center of the valve-base as indicated by the migrated substance of contrasting color.

4. That method of manufacturing inner tubes which consists in, plying up vulcanizable rubber composition tubular, making a valve-base, applying to the center of the valve-base a piece of rubber composition containing migratory coloring matter contrasting with the body of the tube when vulcanized, assembling the valve-base in the tube between plies of the vulcanizable rubber composition, vulcanizing the completely assembled inner tube and causing migration of the contrasting colored substance, and forming an aperture in the tube through the center of the valve-base after the tube has been vulcanized.

5. That method of manufacturing inner tubes which consists in, plying up vulcanizable rubber composition tubular, making a valve-base, applying to the center of the valve-base a piece of rubber composition containing a softening agent and migratory coloring matter contrasting with the body of the tube when vulcanized, assembling the valve-base in the tube between plies of the vulcanizable rubber composition, vulcanizing the completely assembled inner tube and causing migration of the contrasting colored substance, and forming an aperture in the tube through the center of the valve-base after the tube has been vulcanized.

Signed at Indianapolis, county of Marion, and State of Indiana, this 20th day of August, 1923.

JOHN E. CADY.